United States Patent [19]

Meyers

[11] Patent Number: 4,563,723
[45] Date of Patent: Jan. 7, 1986

[54] CHARGEABLE ELECTRICAL POWER SOURCE

[75] Inventor: Joseph Meyers, Cloverdale, Calif.

[73] Assignee: Gordon G. Waltenspiel, Santa Rosa, Calif.

[21] Appl. No.: 635,789

[22] Filed: Jul. 30, 1984

[51] Int. Cl.[4] .................... H01G 1/01; H01G 9/00
[52] U.S. Cl. ............................. 361/305; 361/433
[58] Field of Search ..................... 361/303–306, 361/308–310, 320, 321, 323, 433

[56] References Cited

U.S. PATENT DOCUMENTS

| | | | |
|---|---|---|---|
| 3,105,178 | 9/1963 | Meyers | 361/433 X |
| 3,872,360 | 3/1975 | Sheard | 361/306 X |
| 4,241,378 | 12/1980 | Dorrian | 361/305 |
| 4,283,753 | 8/1981 | Burn | 361/321 |

Primary Examiner—Donald A. Griffin
Attorney, Agent, or Firm—Townsend and Townsend

[57] ABSTRACT

A power source which is self-contained and is comprised of first and second current carrying elements separated by a layer of insulation material. A first of the elements being the negative pole of the power source and being formed of a mixture of silica, carbon, selenium, tantalum, copper and cadmium in weight ratios of 38.0%, 28.5%, 9.5%, 4.25%, 9.5% and 9.5%, respectively. The second element is comprised of a mixture of silica, carbon, selenium and tantalum. The elements and the insulating layer are coupled together in a compact package having end terminals coupled to respective first and second elements.

3 Claims, 3 Drawing Figures

CHARGEABLE ELECTRICAL POWER SOURCE

This invention relates to improvements in self-contained, electrical power sources and, more particularly, to an improved electrical power source similar in construction to an electrical capacitor.

BACKGROUND OF THE INVENTION

In U.S. Pat. No. 3,105,178, there is disclosed an electron storage and power cell which is comprised of a pair of elements of electron absorptive substance for collecting or emitting electrons, one of the elements having a capacity for prolonged electron emissivity when negatively charged relative to the other elements and conductively interconnected therewith. The one element is in the form of a plate formed from proportioned amounts of silica, carbon, selenium, tantalum, copper and nickel. The other element is constructed from a compressed, powdered mixture of proportioned amounts of silica, carbon, selenium and tantalum. The two elements are separated by an electrical insulating element when the elements form the power cell. The power cell is chargeable from a DC voltage supply for use over a period of time as a direct current electrical power source. Following depletion of the charge on the power cell, the power cell itself is recharged to return it to a particular operating voltage and current value. Since the voltage between the elements drops during the use of the power cell, the cell therefore defines a variable power source.

While the power cell made in accordance with the teachings of the patent have been satisfactory for one or more electrical circuit applications, the power cell has been deemed to be limited in that current drain through the power cell is relatively rapid and a need exists for improvements in a power cell of the type described to provide greater reliability as a power source without sacrificing simplicity and without increasing the cost of production to any major extent. The present invention satisfies this need as hereinafter set forth.

SUMMARY OF THE INVENTION

The present invention provides an improvement in the power cell of the above patent by providing a power source having improvements in the plate element which serves as the negative pole of the power source so as to provide a more reliable self-contained, electrical power source that is capable with the power cell disclosed in the above patent. To this end, the plate element which serves as the negative pole of the power source is comprised of proportioned amounts of silica, carbon, selenium, tantalum, copper and cadmium. The combination of these elements in proportioned amounts provides a more stable, longer operation of the power source and provides a greater cooperation of the negative element with the positive element which contains proportioned amounts of silica, carbon, selenium and tantalum. By providing greater stability and long operation, the negative element of the power source of the present invention provides a greater power delivery cycle before the power source is depleted and requires recharging. Moreover, the cost of producing the power source remains substantially minimal, yet the power source of the present invention is suitable for a wide variety of applications which require a self-contained power source, such as portable electrical current carrying equipment of many types.

The primary object of the present invention is to provide a self-contained electrical power source of improved construction in which a pair of electron absorptive elements are formed from respective combinations of selected ingredients which, when coupled together as negative and positive poles of the power source, provide increased stability and greater reliability of operation and longer operating times than that achieved with a power cell of the type described in the above patent to thereby provide a more economical power source while allowing for a wide latitude in the application of the power source to specific electrical circuits.

Other objects of the present invention will become apparent as the following specification progresses, references being had to the accompanying drawing for an illustration of the invention.

IN THE DRAWING

Figure 1:
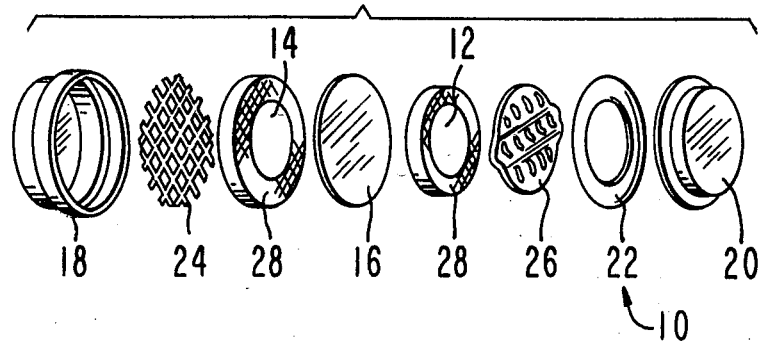
FIG. 1 is an exploded view of the positive and negative elements of the power source of the present invention, showing the way in which such elements are combined with other parts to form the power cell.
Figure 3:
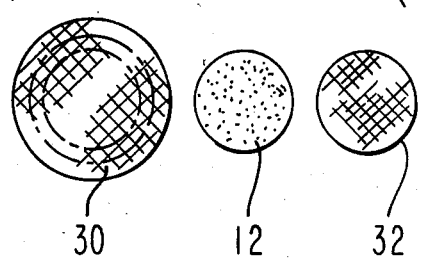
FIG. 3 is an exploded view of the negative element of the power cell separated from the encasing material thereof.
Figure 2:
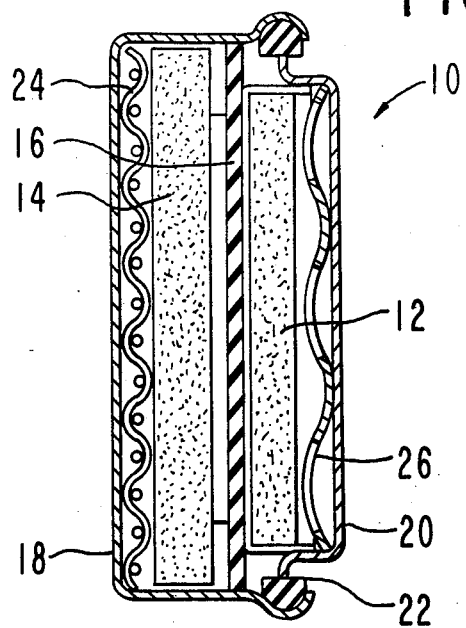
FIG. 2 is a vertical section through the power source of the present invention when assembled.

The improved electrical power source of the present invention is broadly denoted by the numeral 10 and includes a negative power element 12, a positive power element 14, and an insulating layer 16 between elements 12 and 14. Elements 12 and 14 are held together in a container 18 having a lid 20 coupled by attachment means 22 to the container so that the elements 12 and 14 are effectively confined on opposite sides of the insulating layer 16. An electrically conductive screen member 24 is between element 14 and the base of container 18, and an electrically conductive disk spring 26 is between element 12 and lid 20. Thus, electrical contact is made between element 12 and lid 20 and between element 14 and container 18. Attachment means 22 includes an electrically insulating member, such as a neoprene insulating ring, to electrically isolate container 18 from lid 20 to provide for electrical continuity through the power source. Power source 10 is assembled by coupling the parts shown in FIG. 1 together so that they are arranged in the manner shown in FIG. 2.

Each of elements 12 and 14 is encased at its outer periphery with an electrically conductive wrapping 28 comprised of disk-like members 30 and 32. The wrapping is typically of a copper gossamer having 146 threads per square inch, and each of the plate elements 12 an 14 is tightly wrapped in its wrapping 21, wrapping disk 30 being folded over the element and over disk 32 in the manner shown in FIG. 1.

Plate element 12 serves as a negative pole of the power source and is formed of an electron absorptive substance for collecting or emitting electrons. It also has the capacity for prolonged electron emissivity when the power source 10 is coupled to a circuit. Element 12 is made from a compressed, powdered mixture of the following ingredients: silica 38.0%, carbon 28.5%, selenium 9.5%, tantalum 4.25%, copper 9.5% and cadmium 9.5%.

Element 14 is made to serve as the positive pole of power source 10. Element 14 is made of an electron absorptive substance for collecting or emitting electrons, depending upon whether power source 10 is being discharged in use or recharged from a DC source. Element 14 is formed from a compressed powdered mixture of ingredients in the following weight proportions: silica 45%, carbon 40%, selenium 5% and tantalum 10%.

Elements 12 and 14 are each formed by molding under pressure, as in a sintering technique. The electrically conductive wrapping is applied simultaneously during the molding of the elements. The screen grid of the wrapping 28 provides a plurality of electrical contacts over the surface of each of the elements 12 and 14. Each point of wire intersection in the screen places its contacted element surface in electrical communication with other contacted element surfaces of the element as well as the end terminal defined by container 18 and lid 20. Such a construction allows for a uniform charge distribution upon elements 12 and 14.

Insulation layer 16 is a material having a dielectric constant. It may be formed from a fabric pad chemically treated and impregnated with an insulating substance, such as neoprene. Layer 16 serves to space elements 12 and 14 relative to and away from each other.

Spring member 26 forms an electrical contact between plate element 12 and lid 20. Member 26 may be formed from a corrugated piece of spring steel having oval perforations to provide resiliency to the spring. When the power source 10 is assembled, spring member 26 forces plate element 12 against layer 16 and retains the other parts of the assembly in proper position with respect to each other.

The size of the power source 10 can be selected depending upon the capacity of charge which the power source is designed to have. The greater the size, the more electrical power output will be provided in the power source. Typically, the power source can have a diameter of one to four or five inches to provide a power output of from 4 to 25 watts. The dimensions can vary depending upon the desired power output. Moreover, a plurality of power cells 10 may be placed in series relationship with each other to increase the voltage of the total number of power sources.

What is claimed is:

1. A rechargeable electrical power source comprising:
   first and second elements of electron absorptive substance, each element being adapted for collecting electrons during a charging mode and for emitting electrons during a discharging mode, the first element further having a capacity for prolonged electron emissivity when negatively charged relative to the second element and operably coupled therewith, said first element being formed from a mixture of silica, carbon, selenium, tantalum, copper and cadmium; and
   a layer of insulation material between the first and second elements.

2. A power source as set forth in claim 1, wherein the second element is formed from a mixture of silica, carbon, selenium and tantalum.

3. A power source as set forth in claim 1, wherein the ingredients of the first element are in the following weight proportions: silica 38.0%, carbon 28.5%, selenium 9.5%, tantalum 4.245%, copper 9.5% and cadmium 9.5%.

* * * * *